(12) United States Patent
Okawa et al.

(10) Patent No.: US 7,024,634 B2
(45) Date of Patent: Apr. 4, 2006

(54) DISPLAY CONTROL SYSTEM CAUSING IMAGE ON DISPLAY SCREEN TO DISAPPEAR AND REAPPEAR IN A FRIENDLY MANNER TO USER

(75) Inventors: Toru Okawa, Kawasaki (JP); Ryuichi Matsukura, Kawasaki (JP); Yasuo Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 196 days.

(21) Appl. No.: 09/734,701

(22) Filed: Dec. 13, 2000

(65) Prior Publication Data

US 2001/0000667 A1 May 3, 2001

Related U.S. Application Data

(62) Division of application No. 08/745,285, filed on Nov. 8, 1996, now Pat. No. 6,181,337.

(30) Foreign Application Priority Data

Nov. 22, 1995 (JP) ............................................. 7-304036

(51) Int. Cl.
*G09G 5/00* (2006.01)

(52) U.S. Cl. .................. 715/770; 715/531; 382/258
(58) Field of Classification Search .................. 715/770, 715/772, 860, 862, 530, 531; 345/661, 676, 345/650, 706, 772, 861, 866; 382/258, 309, 382/295, 298, 310, 311
See application file for complete search history.

(56) References Cited

U.S. PATENT DOCUMENTS 5,448,695 A    9/1995    Douglas et al.

5,636,336 A  *  6/1997  Adachi ........................ 345/667
5,781,122 A  *  7/1998  Katagiri ...................... 340/7.55

FOREIGN PATENT DOCUMENTS

| JP | 57-164228 | 10/1982 |
|----|-----------|---------|
| JP | 3-269679  | 12/1991 |
| JP | 6-131436  | 5/1994  |
| JP | 6-230918  | 8/1994  |

* cited by examiner

*Primary Examiner*—Ba Huynh
(74) *Attorney, Agent, or Firm*—Staas & Halsey LLP

(57) ABSTRACT

The present invention provides a display control system for controlling data which is displayed on a screen of a display unit. The system includes a pointing device for pointing to a position on the screen of the display unit, a deleting unit for gradually deleting elements of data from the screen of the display unit as if the elements were gradually being sucked at the position pointed to by the pointing device, and a density controller for controlling the density of elements remaining on the screen of the display unit so that the density is gradually decreased in accordance with suction of the elements. The present invention also provides a data processing apparatus which includes a pointing device for pointing to a menu on the screen of the display unit, a controller for causing menu items included in the menu pointed to by the pointing device to be display at a position on the screen of the display unit one by one in turns at predetermined intervals, a detecting unit for detecting a predetermined operation, and a selecting unit for selecting, as a menu item, to be activated, a menu item displayed on the screen of the display unit when the detecting unit detects the predetermined operation.

23 Claims, 11 Drawing Sheets

DISPLAY CONTROL SYSTEM CAUSING IMAGE ON DISPLAY SCREEN TO DISAPPEAR AND REAPPEAR IN A FRIENDLY MANNER TO USER

This application is a divisional application of application Ser. No. 08/745,285, filed Nov. 8, 1996, now U.S. Pat. No. 6,181,337 now allowed.

BACKGROUND OF THE INVENTION (1) Field of the Invention

The present invention generally relates to a display control system which is constituted in a data processing apparatus, such as a portable remote computer terminal or a general purpose computer. More particularly, the present invention relates to a display control system and method which causes an image on a display screen to disappear and reappear in a friendly manner to a user.

(2) Description of the Related Art

In recent years, persons who are not specialists in computer technology have started using computers (data processing apparatuses). It is desirable that not only functions and performance of the computers be improved but also that users who are not specialists in the computer technology can enjoy using the computers.

In conventional computers, a high importance is placed on improving functions and performance. For example, in the case of a process for making data (e.g., character images and/or graphical images) on a display screen disappear, attention is mainly paid to how the data can disappear from the display screen at a high speed and by use of a small amount of software. In the case of a process for selecting a menu item from a menu shown on a display screen, attention is mainly paid to how the menu item can be selected at a high speed and by use of a small amount of software.

However, according to the conventional developing concept for the computers as described above, although the functions and performance of the computers can be improved, the computers are not necessarily friendly machines to users.

Thus, the applicant has proposed a data processing apparatus in which data disappears from and reappears on a display screen in a friendly manner. In this data processing apparatus, data (character images and/or graphical images) convergently disappear from the display screen like water being sucked by an aspirator and radially or spirally appear on the display screen like water welling up.

It is desirable that an appearance and disappearance manner of the data on the display screen be more friendly to users.

In addition, it is desirable that menu items can be displayed on a limited area of the display screen so as to be easily selected by a user.

SUMMARY OF THE INVENTION

Accordingly, a general object of the present invention is to provide a novel and useful display control system in which the disadvantages of the aforementioned prior art are eliminated.

A specific object of the present invention is to provide a display control system which can cause data (e.g., character images and/or graphical images) on a display screen to gradually disappear and reappear in more friendly manners to users.

The above objects of the present invention are achieved by a display control system for controlling data which is displayed on a screen of a display unit, the system comprising: pointing means for pointing to a position on the screen of the display unit; deleting means for gradually deleting elements of data from the screen of the display unit as if the elements were gradually being sucked at the position pointed to by the pointing means; and density control means for controlling the density of elements remaining on the screen of the display unit so that the density is gradually decreased in accordance with suction of the elements.

The above objects of the present invention are also achieved by a display control system for controlling data which is displayed on a screen of a display unit, the system comprising: pointing means for pointing to a position on the screen of the display unit; deleting means for gradually deleting elements of data from the screen of the display unit as if the elements were gradually being sucked at the position pointed to by the pointing means; and speed control means for controlling a speed at which the elements are gradually deleted so that the speed is gradually increased in accordance with suction of the elements.

The above objects of the present invention are also achieved by a display control system for controlling data which is displayed on a screen of a display unit, the system comprising: pointing means for pointing to a position on the screen of the display unit; restoring means for gradually restoring elements of data on the screen of the display unit as if the elements were welling up from the position pointed to by the pointing means; and density control means for controlling the density of elements restored on the screen of the display unit so that the density is gradually increased in accordance with appearance of the elements.

The above objects of the present invention are also achieved by a display control system for controlling data which is displayed on a screen of a display unit, the system comprising: pointing means for pointing to a position on the screen of the display unit; restoring means for gradually restoring elements of data on the screen of the display unit as if the elements were welling up from the position pointed to by the pointing means; and speed control means for controlling a speed at which the elements are gradually restored so that the speed is gradually decreased in accordance with appearance of the elements.

According to the present invention, while the elements of the data are being gradually deleted and restored, the density of the elements or the speed at which the elements are deleted are controlled. As a result, the elements of the data can be gradually deleted from the screen of the display unit as if the elements were being sucked at the position pointed to (pointed position) more realistically, and the elements of the data can be gradually restored on the screen of the display unit as if the elements were welling up from the pointed position more realistically. Thus, data can disappear from and reappear on the screen on the display unit in a manner more friendly to a user.

Another object of the present invention is to provide a data processing apparatus in which menu items can be displayed on a limited area of the display screen so as to be easily selected by a user.

This object of the present invention is achieved by a data processing apparatus in which a process corresponding to a menu item selected from menu items displayed on a screen of a display unit is executed, comprising: pointing means for pointing to a menu on the screen of the display unit; control means for, in response to a pointing operation of the pointing means, causing menu items included in the menu pointed to by the pointing means to be display at a position on the screen of the display unit one by one in turns at predetermined intervals; detecting means for detecting a predetermined operation; and selecting means for selecting, as a menu item to be activated, a menu item displayed on the screen of the display unit when the detecting means detects the predetermined operation.

According to the present invention, menu items included in a pointed menu are displayed one by one in turns at predetermined interval on the screen of the display unit. That is, all the menu items which can be selected are not simultaneously displayed on the screen of the display unit. A menu item which is displayed when the predetermined operation is performed is then selected. Thus, menu items can be displayed on a limited area of the display screen so as to be easy to be selected by a user.

BRIEF DESCRIPTION OF THE DRAWINGS

Other objects, features and advantages of the present invention will be apparent from the following description when read in conjunction with the accompanying drawings, in which.

DETAILED DESCRIPTION OF PREFERRED EMBODIMENTS

A description will now be given of a first embodiment of the present invention.

Figure 1:
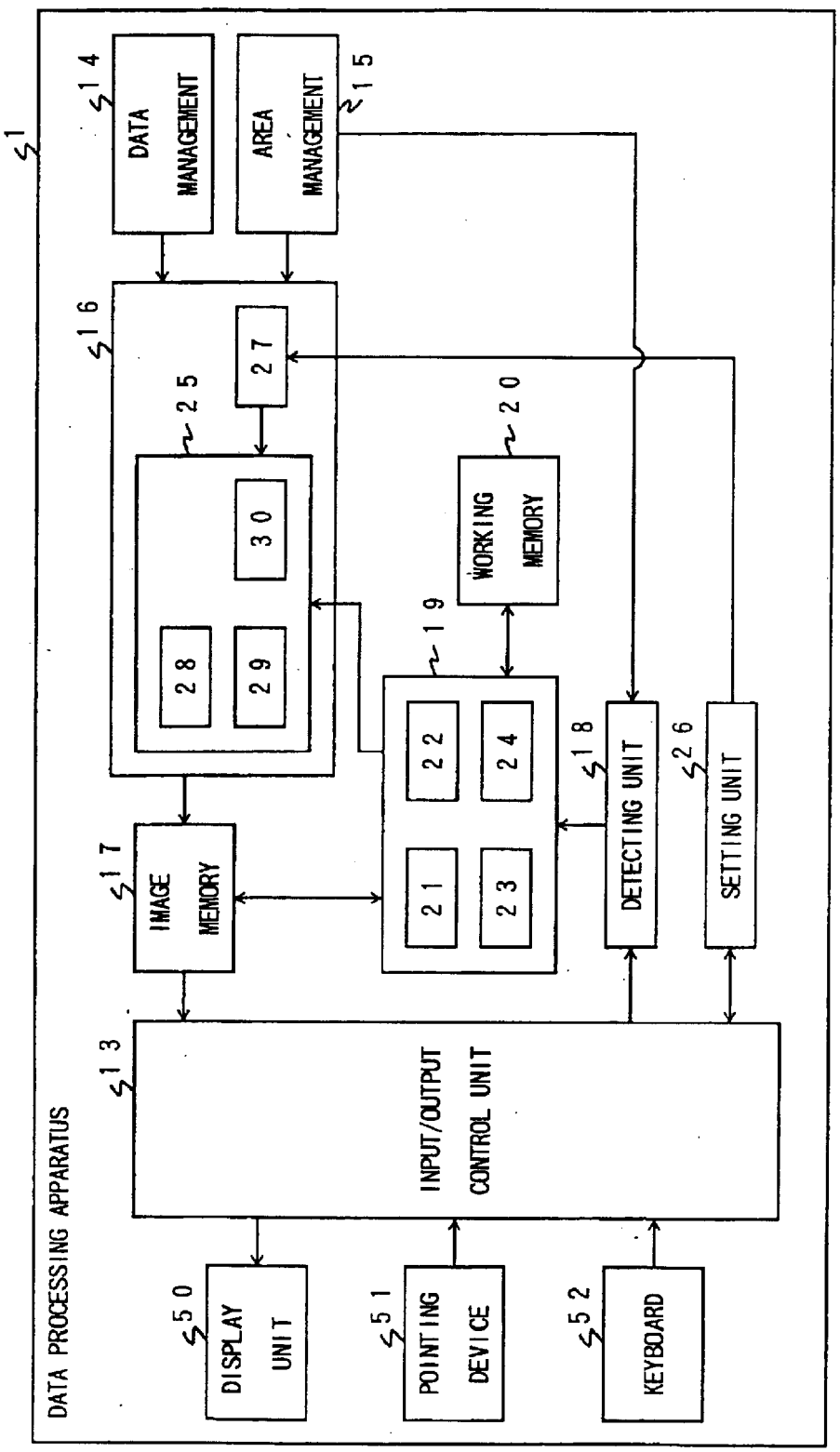
FIG. 1 is a functional block diagram illustrating a data processing apparatus including a display control system according to a first embodiment of the present invention.

A data processing apparatus according to the first embodiment of the present invention is functionally formed as shown in FIG. 1. Referring to FIG. 1, the data processing apparatus 1 has a display unit 50, a pointing device 51 and a keyboard 52. The pointing device 51 is, for example, a mouse. The data processing apparatus 1 further has an input/output controller 13, a data management unit 14, an area management unit 15, a display data generating unit 16, an image memory 17, a detecting unit 18, a deleting unit 19 and a working memory 20.

Data (e.g., character images and/or graphical images) is displayed on a screen of the display unit 50. The pointing device 51 points to positions on the screen of the display unit 50. The keyboard 52 is used to input information to the data processing apparatus by a user. The input/output control unit 13 performs an interface process for the display unit 50, the pointing device 51 and the keyboard 52.

The data management unit 14 manages data to be displayed on the screen of the display unit 50. The area management unit 15 manages area information indicating an area in which the data managed by the data management unit 14 should be displayed on the screen of the display unit 50.

The display data generating unit 16 generates data (e.g., character images and/or graphical images) to be displayed on the screen of the display unit 50 using the data managed by the data management unit 14 and the area information managed by the area management unit 15. The data generated by the display data generating unit 16 is expanded on the image memory 17. The data expanded on the image memory 17 is displayed on the screen of the display unit 50. The detecting unit 18 detects, with reference to areas managed by the area management unit 15, an area including a position which is pointed to by the pointing device 51 on the screen of the display unit 50.

The deleting unit 19 performs a process for deleting data within the area detected by the detecting unit 18. In this process, the data (e.g., character images and/or graphic images) is deleted as if the data was convergently being sucked at a position pointed to by the pointing device 51. The working memory 20 is used for the process performed by the deleting unit 19.

The deleting unit 19 has a first specifying block 21, a first density control block 22, a first speed control block 23 and a completion data output block 24. The first specifying block 21 specifies data which should be deleted from the screen of the display unit 50 as if the data was convergently being sucked at a position. The first density control block 22 controls the density of data displayed on the screen of the display unit 50 so that the density is gradually decreased in accordance with the convergent suction of the data. The first speed control block 23 controls the speed at which the data is convergently sucked at the position on the screen of the display unit 50, in accordance with the convergent suction of the data. The completion data output block 24 causes completion data to be displayed at a position near the position into which the data is convergently sucked, when the process of the convergent suction of the data is completed.

The display data generating unit 16 has a restoring unit 25 and an exclusion unit 27. The restoring unit 25 restores the data which was deleted from the screen of the display unit 50 by the deleting unit 19. The data is restored on the screen of the display unit 50 so as to well up from a position pointed by the pointing device 51. A setting unit 26 sets information indicating a type (e.g., graphics, text or the like) of data in accordance with an instruction input from the keyboard 52. The exclusion unit 27 excludes the type, indicated by information set by the setting unit 26, of data from the data which should be restored by the restoring unit 25.

The restoring unit 25 has a second specifying block 28, a second density control block 29 and a second speed control block 30. The second specifying block 28 specifies data which is to be restored on the screen of the display unit 50. The second density control portion 29 controls the density of data which is being restored so that the density is gradually increased in accordance with appearance of the restored data. The second speed control portion 30 controls a speed at which the data wells up from the position pointed to by the pointing device 51, in accordance with appearance of the restored data.

In the data processing apparatus 1 having the above structure, the detecting unit 18 detects an area including a position pointed to (pointed position) by the pointing device 51 on the screen of the display unit 50. The deleting unit 19 then deletes data within the detected area, out of the data expanded on the image memory 17, from the screen of the display unit 50 using the working memory 20 as if the data was convergently being sucked at the pointed position.

While the data is being deleted as if the data was convergently being sucked, the first density control block 22 of the deleting unit 19 controls the density of remaining data which has been not yet deleted from the screen so that the density is gradually decreased in accordance the convergent suction of the data. The first speed control block 23 of the deleting unit 19 controls the speed at which the data is convergently sucked in accordance with the convergent suction of the data. When the data is completely deleted, the completion data output block 24 causes the completion data (e.g., an image of a column of smoke) to be displayed at a position near the position into which the data has been convergently sucked.

When a request for restoration of the data which was deleted by the deleting unit 19 is received by the restoring unit 25, the restoring unit 25 restores, on the screen of the display unit 50, the data which was deleted so that the data wells up from the position pointed to by the pointing device 51. While the data is being restored so as to well up, the second density control block 29 of the restoring unit 25 controls the density of the data restored on the screen so that the density is gradually increased in accordance with appearance of the data. The second speed control block 30 of the restoring unit 25 controls the speed at which the data wells up on the screen in accordance with the appearance of the data.

According to the data processing apparatus 1 as described above, while the data (such as character images and/or graphical images) is being deleted as if the data was convergently being sucked at a position on the screen of the display unit 50, the density of the remaining data is gradually decreased in accordance with the convergent suction of the data. The speed at which the data is convergently sucked is controlled in accordance with the convergent suction of the data. Further, while the data is being restored as if the data was welling up from a position on the screen of the display unit 50, the density of the data is gradually increased in accordance with the appearance of the data. The speed at which the data wells up is controlled in accordance with the appearance of the data. Thus, the data can disappear and appear from the screen of the display unit 50 in a more friendly manner to the user.

Figure 2:
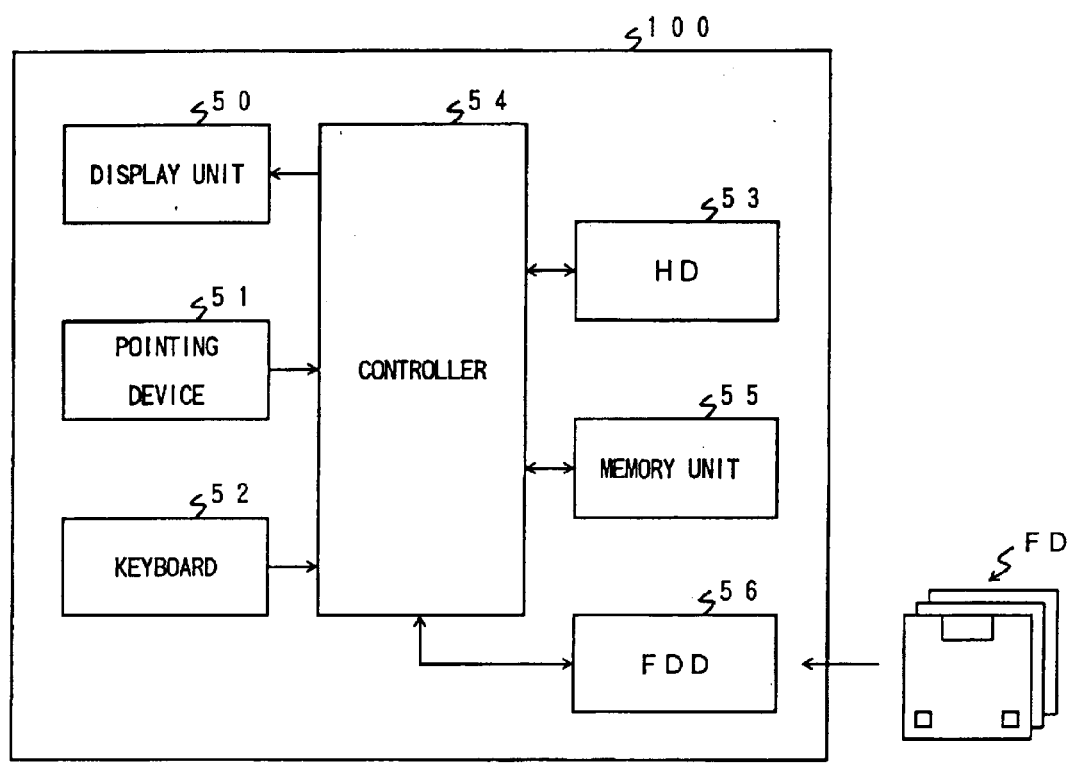
FIG. 2 is a block diagram illustrating an example of a hardware constitution of the data processing apparatus according to the first embodiment of the present invention.

The data processing apparatus as described above may be formed, for example, using a general purpose computer system (e.g., a personal computer). In this case, the computer system has hardware as shown in FIG. 2. Referring to FIG. 2, the computer system 100 has the display unit 50, the pointing device 51, such as a mouse, and the keyboard 52. The computer system 100 further has a controller 54, a hard disk unit 53 (HD), a memory unit 55 and a floppy disk drive unit 56 (FDD).

The controller 54 includes a CPU (Central Processing Unit) which performs various processes corresponding to the functions of the data processing apparatus as described above. The hard disk unit 53 stores data files which may be processed in the computer system 100. Application programs may be stored in the hard disk unit 53. The memory unit 55 includes an image memory, a working memory and various types of memories (a RAM and a ROM) for storing data and programs. The floppy disk drive 56 drives a floppy disk (FD) loaded therein, and data read out from the floppy disk (FD) is supplied from the floppy disk drive unit 56 to the controller 54. A program corresponding to the functions of the data processing apparatus described above is supplied as a part of an application program, such as a word-processing application program or a graphic processing application program, to this computer system 100 from floppy disks. The application program read out from the floppy disks by the floppy disk drive unit 56 is installed into the hard disk unit 53 under the control of the controller 54. The CPU in the controller 54 executes processes in accordance with the application program using a predetermined memory (a RAM) in the memory unit 55. As a result, for example, a file stored in the hard disk unit (HD) 53 is opened, and data (e.g., character images and/or graphical images) on a page of the opened file is then displayed on the screen of the display unit 50.

A user inputs a "deletion request" using the keyboard 52 to delete data on the page of the opened file. In response to the "deletion request", the CPU of the controller 54 starts a process in accordance with a procedure shown in FIG. 3.

Figure 3:
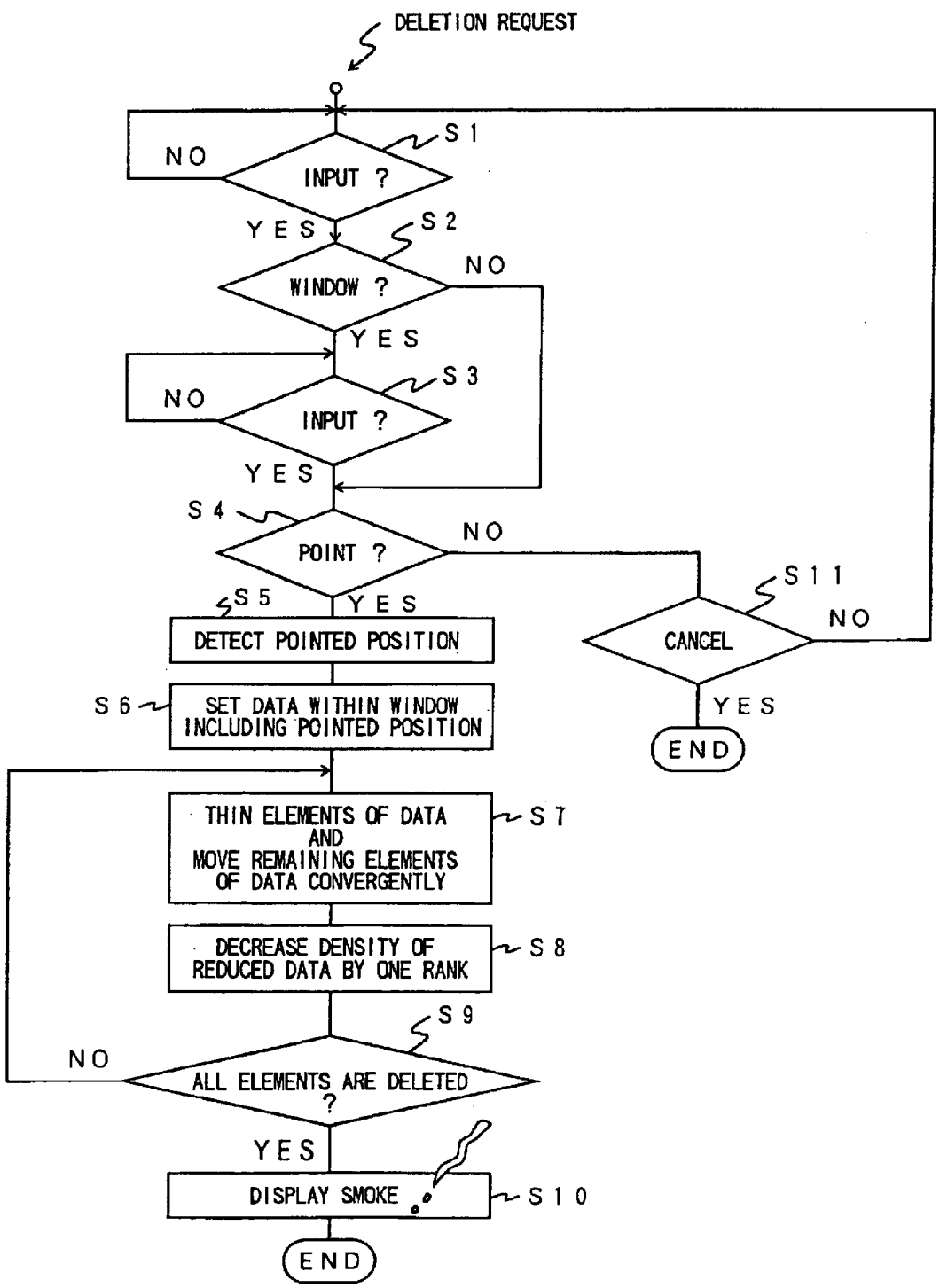
FIG. 3 is a flowchart illustrating a process for deleting data from a display screen.

Referring to FIG. 3, the CPU is waiting for an input operation in step S1. When the CPU detects that an input operation is performed, the CPU determines, in step S2, whether or not the input operation is an operation for setting a window on the screen of the display unit 50. If the operation for setting a window on the screen of the display unit 50 is performed, the CPU waits for an input operation again, in step S3. When the CPU detects that an input operation is performed, the CPU determines, in step S4, whether or not the input operation is an operation for pointing to a position on the screen of the display unit 50 using the pointing device 51. If the operation for pointing to a position on the screen of the display unit 50 is performed, the CPU detects (recognizes) the pointed position in step S5. The CPU then sets, in step S6, data within the window including the pointed position as data to be deleted.

If neither the operation for setting the window nor the operation for pointing to the position is performed, it is further determined, in step S11, whether or not an operation for canceling the process in response to the "deletion request" has been performed. If the operation for canceling the process has been performed, the process is interrupted. On the other hand, if the input operation is not the operation for canceling the process, the CPU further waits for the operation for setting the window and/or the operation for pointing to the position (in steps S1 and S3).

If a position is pointed before the operation for setting a window is performed, all data within the screen of the display unit 50 is set as data to be deleted in step S6.

After the data to be deleted is set as described above, the CPU starts steps for deleting the data. In step S7, elements of the data (e.g., characters of a character image, image blocks of graphical image, pixels of an image or the like) within the specified window are thinned in accordance with a predetermined rule. Remaining elements in the window are then moved toward the pointed position convergently so as to be close to each other. As a result, reduced data (a reduced image) is formed of the remaining elements. The reduced data is set as new data to be deleted. The CPU then causes the density of the reduced data to be decreased by one rank, in step S8. For example, the number of colored dots (e.g., black dots) included in the elements forming the reduced data is decreased by one rank in accordance with a predetermined rule.

After this, the CPU determines, in step S9, whether or not all the elements of the data in the window have been deleted. If all the elements in the window have not yet been deleted, the process returns to step S7. After this, steps S7 and S8 are repeatedly executed until all the elements in the window are deleted. If the CPU determines, in step S9, that all the elements in the window have been deleted, the CPU causes the display unit 50 to display a column of smoke (meaning that all the data have been completely deleted) at a position near the pointed position on the screen, in step S10.

Figure 4A:
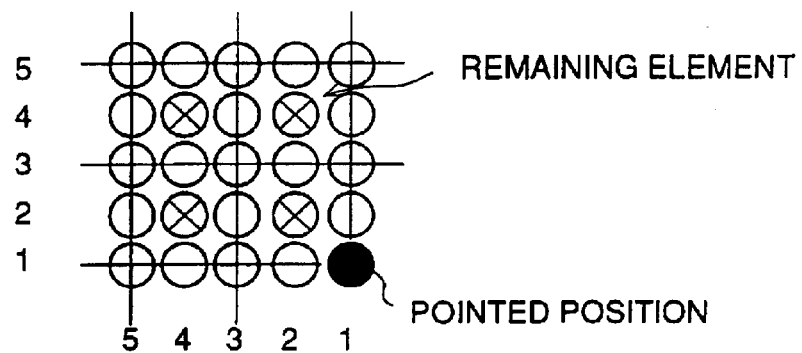
FIGS. 4A and 4B are diagrams illustrating an example of movement of elements of data which are being deleted from the display screen.

While step S7 is repeatedly being executed, the data (the image) within the specified window is reduced and deleted, for example, in accordance with a rule as shown in FIG. 4A.

Figure 4B:
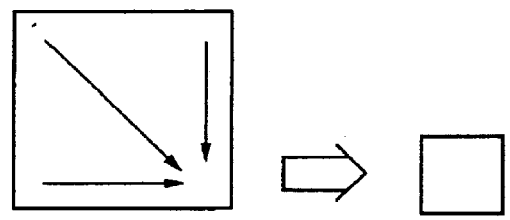

Referring to FIG. 4A, data to be deleted is formed of elements arranged in a matrix. Every time step S7 is executed, elements on odd lines (1, 3, 5, . . .) in row and column directions are deleted. The remaining elements (indicated by (X)) are then convergently moved toward the pointed position so as to be close to each other. As a result, while step S7 is repeatedly being executed, the data (e.g., a character image) is gradually reduced as if the data was being sucked at the pointed position, as shown in FIG. 4B. Finally, the data is completely deleted from the screen of the display unit 50.

Figure 5:
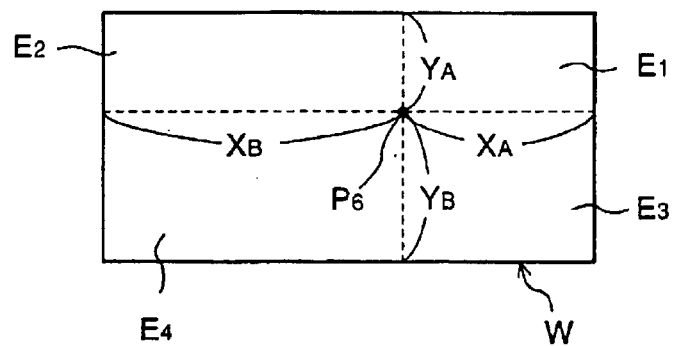
FIG. 5 is a diagram illustrating a point into which elements of data should be convergently sucked in the process for deleting the data.

In a case where a position Po is pointed to in a window W as shown in FIG. 5, the elements of the data in the window W are thinned as follows.

When the position Po is pointed to in the window W, the window W is divided into areas E1 ($X_A \times Y_A$), E2 ($X_B \times Y_A$), E3 ($X_A \times Y_B$) and E4 ($X_B \times Y_B$). While the elements arranged in the row direction (X) in each of the areas E2 and E4 are being repeatedly thinned the number $X_B$ of times, the elements arranged in the row direction (X) in each of the areas E1 and E3 are being repeatedly thinned the number $X_A$ of times. In addition, while the elements arranged in the column direction (Y) in each of the areas E1 and E2 are being repeatedly thinned the number $Y_A$ of times, the elements arranged in the column direction (Y) in each of the areas E3 and E4 are being repeatedly thinned the number $Y_B$ of times. According to the above manner in which the elements in the respective areas E1, E2, E3 and E4 are deleted, the elements in the respective areas E1, E2, E3 and E4 are approximately simultaneously deleted.

A step for pivoting reduced data obtained in step S7 about the pointed position by a predetermined angle may be added after step S7 or S8. In this case, the elements of the data can be moved toward the pointed position as if the elements were spirally sucked at the pointed position.

Figure 6:
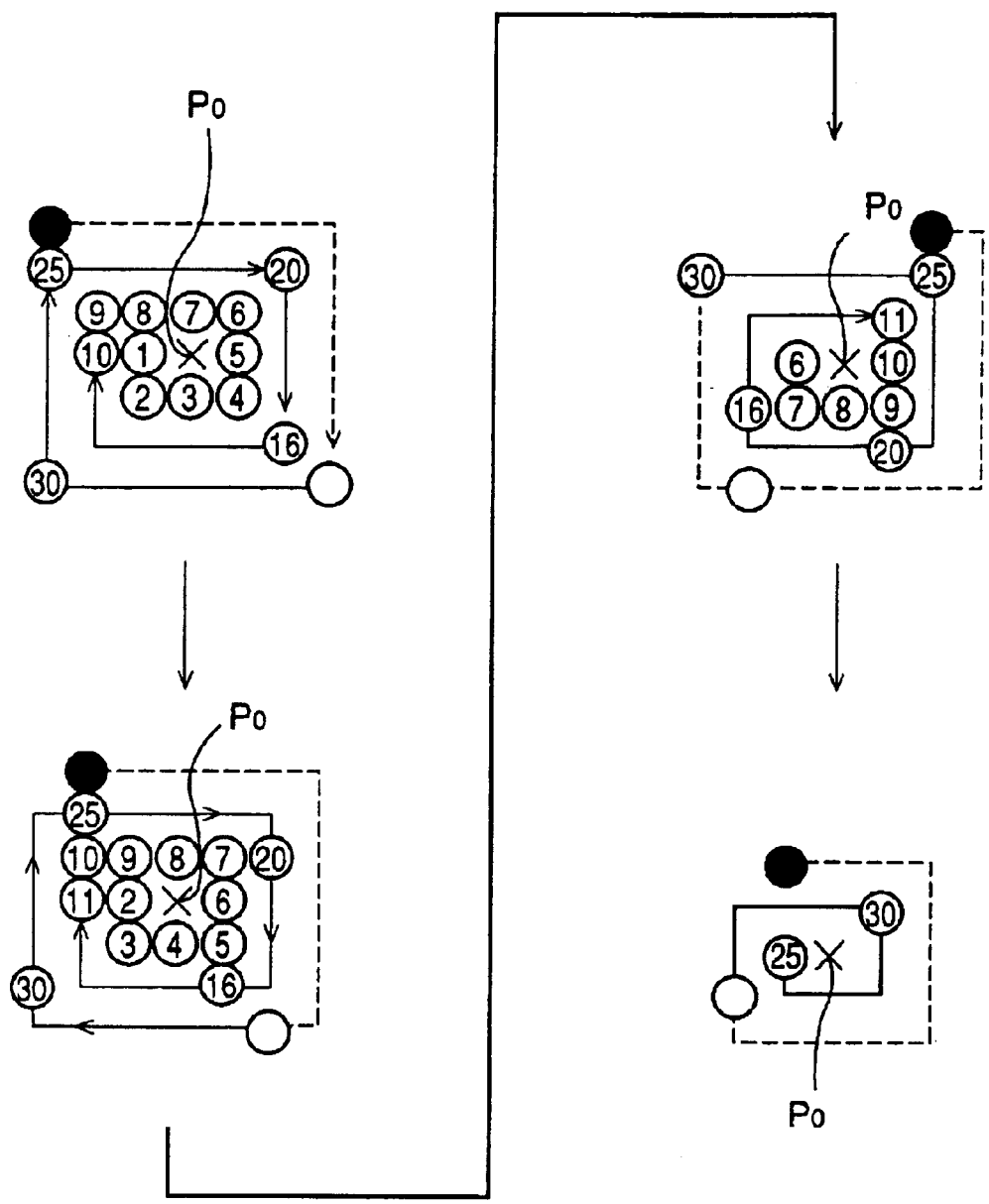
FIG. 6 is a diagram illustrating another example of movement of elements of data which are being deleted from the display screen.

The elements can be also moved spirally in a manner as shown in FIG. 6. In this case, every time an element in contact with a predetermined side of the pointed position Po is deleted, the elements are spirally moved toward the pointed position Po.

As has been described above, in response to the "deletion request", the elements of the data in the specified window on the screen of the display unit 50 are deleted as if the elements were convergently sucked at the pointed position in the specified window. Further, while elements are being deleted so that the data is reduced, the density of the reduced data is gradually decreased in accordance with the suction of the elements. Thus, the data can be deleted from the screen of the display unit 50 as if the data was realistically sucked at a point.

Figure 7:
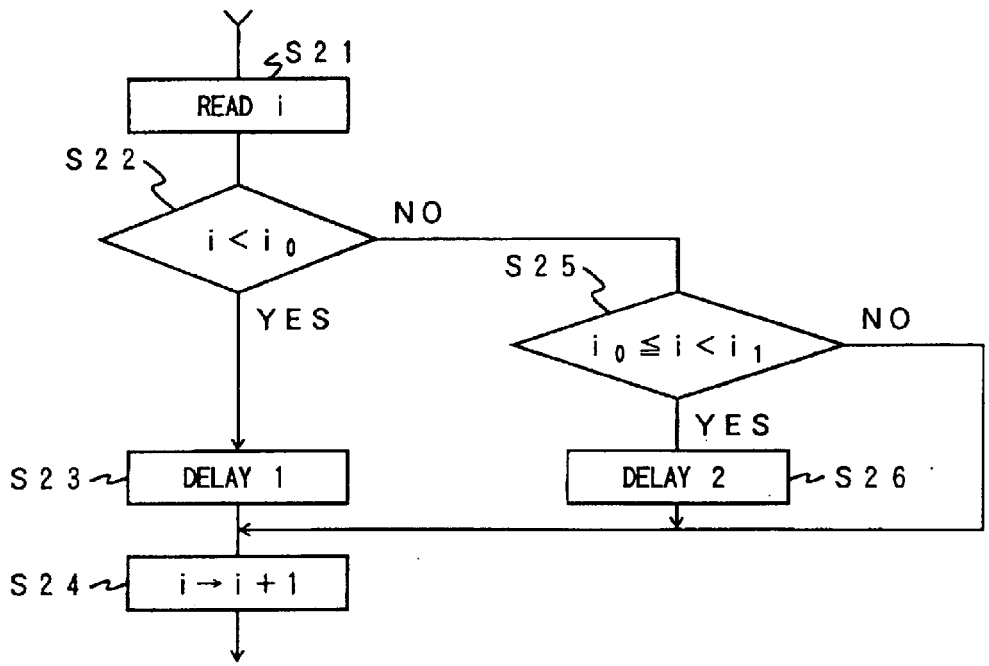
FIG. 7 is a flowchart illustrating a process for restoring data on the display screen.

In the process shown in FIG. 3, steps shown in FIG. 7 may be added after step S8 or substituted for step S8. In the following embodiment, for example, steps shown in FIG. 7 are substituted for step S8 shown in FIG. 3. Due to a process of steps shown in FIG. 7, the speed at which the elements of the data are deleted is increased in accordance with a degree of deletion of the elements.

After the reduced data is obtained in step S7 shown in FIG. 3, the CPU starts a process of steps shown in FIG. 7. Referring to FIG. 7, the CPU reads a count value i of an internal counter in step S21. The internal counter has already been initialized at "0". The CPU determines, in step S22, whether the count value i is less than a first reference value io (i<io). If the count value i is less than the first reference value io, a delay timer having a first delay time (1) is activated in step S23. After the first delay time (1) elapses, the CPU causes the count value i of the internal counter to increment by one (i→i+1) in step S24. After this, step S9 shown in FIG. 3 is executed.

Until the count value i of the internal counter reaches the first reference value io, step S7 shown in FIG. 3 and steps S21, S22, S23 and S24 shown in FIG. 7 are repeatedly executed. As a result, a process for reducing the data in step S7 is repeatedly executed at first intervals each of which corresponds to the first delay time (1).

When the count value i of the internal counter reaches the first reference value io, the CPU further determines, in step S25, whether the count value i of the internal counter is within a range between the first reference value io and a second reference value i1 greater than the first reference value io (io≦i<i1). If the count value i is within the range (io≦i<i1), a delay timer having a second delay time (2) is activated in step S26. The second delay time (2) is less than the first delay time (1) described above. After the second delay time (2) elapses, the CPU causes the count value i of the internal counter to increment by one (i→i+1) in step S24. In this case, until the count value i of the internal counter reaches the second reference value i1, step S7 shown in FIG. 3 and steps S21, S22, S25, S26 and S24 are repeatedly executed. As a result, the process for reducing the data in step S7 is repeatedly executed at second intervals each of which corresponds to the second delay time (2). Since the second intervals corresponding to the second delay time (2) are less than the first intervals corresponding to the first delay time (1), the speed at which the data is reduced (the elements of the data are deleted) is increased.

Further, if the count value i exceeds the second reference value i1 (i>i1), the steps S7 is executed every time the count value i is incremented by one without a delay time. As a result, the speed at which data is reduced (the element of the data are deleted) is further increased.

According to the above process, the speed at which the elements of the data are deleted is gradually increased in accordance with the degree of the deletion of the elements. Thus, it appears that the elements (e.g., characters) of the data (e.g., a character image) can be more really sucked at the pointed position convergently.

A user inputs a "restoration request" using the keyboard 52 to restore data which was deleted. In response to the "restoration request", the CPU of the controller 54 starts a process in accordance with a procedure shown in FIG. 8.

Figure 8:
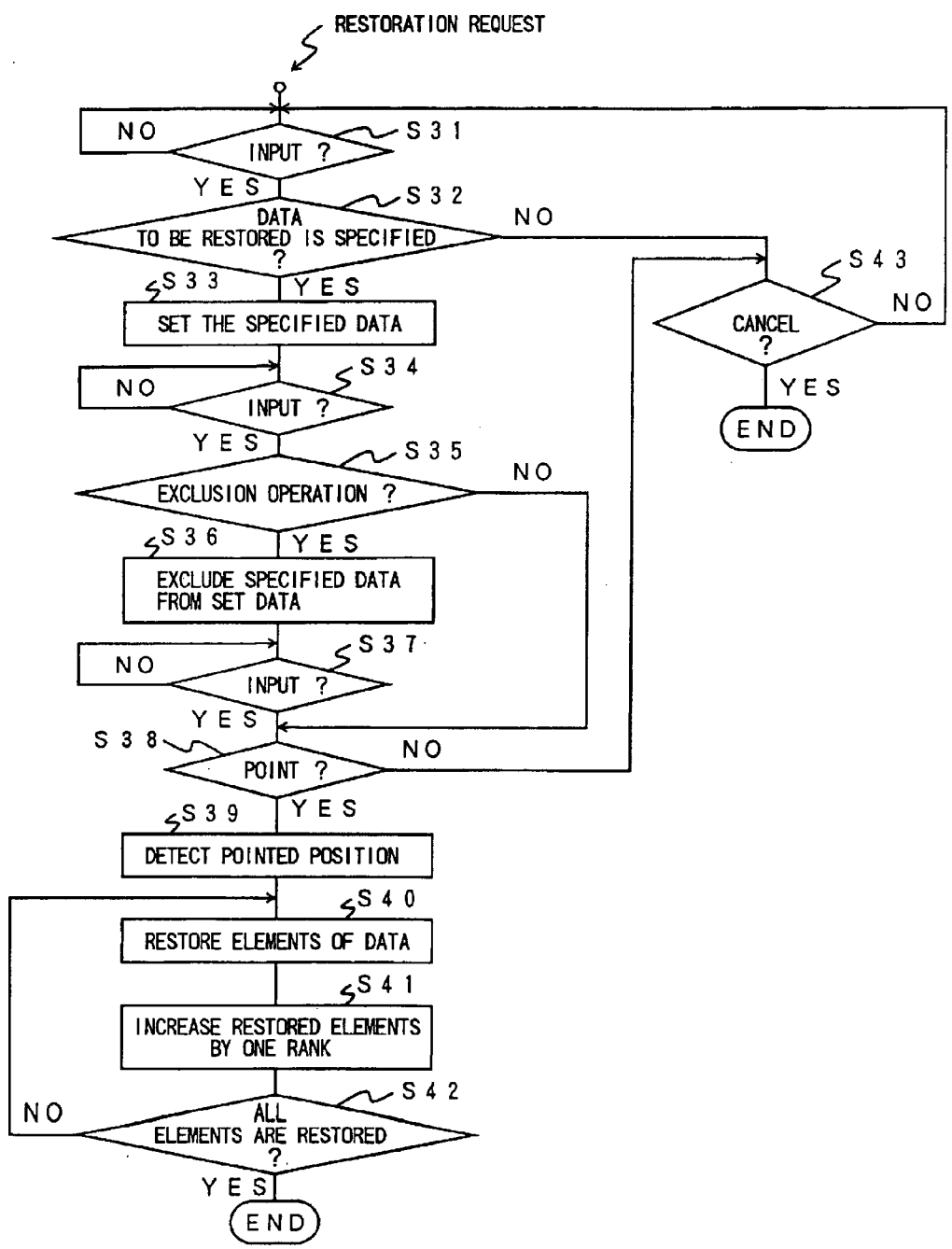
FIG. 8 is a flowchart illustrating a process for controlling a speed at which the data is deleted.

Referring to FIG. 8, the CPU is waiting for an input operation in step S31. If the input operation is performed, the CPU further determines, in step S32, whether the input operation is an operation for specifying data to be restored. If the operation for specifying data to be restored is performed, the CPU sets the data to be restored in the working memory in step S33. After this, the CPU is waiting an input operation again in step S34. If an input operation is performed, the CPU further determines, in step S35, whether the input operation is an instruction of an exclusion operation. The exclusion operation is an operation for excluding a type of data (e.g., a graphical image, a character image, and/or a numeral image) from the data which has been set as the data to be restored. If the instruction of the exclusion operation is input, the CPU executes the exclusion operation, in step S36, so that one or a plurality of types of data are excluded from the data to be set as the data to be restored. After this, the CPU is waiting for an input operation again in step S37. If an input operation is performed, the CPU determines, in step S38, whether the input operation is an operation for pointing to a position on the screen of the display unit 50 using the pointing device 51. If the operation for pointing to a position is performed, the CPU detects (recognizes) the pointed position in step S39.

If the exclusion operation is not performed, all the data initially specified by the user is set as the data to be restored. In addition, if the CPU determines, in steps S43, that an operation for canceling the process has been performed, the CPU ends the process.

After the CPU detects (recognizes) the pointed position in step S39, the CPU starts a process for restoring the data on the screen of the display unit 50. In step S40, elements are selected from the data to be restored in accordance with a rule inversely related to the rule in which the elements of the data to be deleted are thinned as described above (see FIG. 4A). The selected elements are rearranged and displayed so as to be close to each other at positions including the pointed position on the screen of the display unit 50. The displayed elements are expanded on the screen of the display unit 50 in accordance with a rule inversely related to the rule in which the elements are moved toward the selected point so as to move close to each other to form the reduced data as described above (see FIGS. 4A and 4B). Step S40 is executed once, so that the data is partially restored on the screen of the display unit 50. Data formed of the elements which are expanded is referred to, for example, as sparse data. The sparse data obtained in step S40 has a density (initially at a minimum value).

In step S41, the CPU causes the density of the sparse data obtained in step S40 to be increased by one rank. For example, the number of colored dots (e.g., black dots) included in each of the elements of the sparse data is increased by one rank in accordance with a predetermined rule. After this, the CPU determines, in step S42, whether all the elements of the data set as the data to be restored are restored on the screen of the display unit 50. If there are elements to be restored, the process returns to step S40.

In step S40 at this time, elements are selected from the data to be restored in accordance with the rule described above. The selected elements are then added to the sparse data so that all elements are close to each other. All the elements are expanded in accordance with the rule described above so that new sparse data is obtained. After this, in step S41, the density of the sparse data is increased by one rank in the manner described above. Until all elements of the data set as the data to be restored are restored, the process in steps S40 and S41 is repeatedly executed. As a result, the elements of the data are restored on the screen of the display unit 50 as if the elements welled up from the pointed position. The density of the data restored on the screen of the display unit 50 is gradually increased in accordance with increasing of the number of elements forming the data restored on the screen.

According to the above process in response to the "restoration request" from the user, the data is restored on the screen of the display unit 50 as if the data welled up from the pointed position. Further, while the data is being restored, the density of the data is gradually increased in accordance with the appearance of the data. Thus, the data (e.g., a character image and/or a graphical image) can be restored on the screen of the display unit 50 as if the data well up realistically.

The elements of the data may be restored on the screen in a rule which is inversely related to the rule in which the elements are spirally deleted as described above (e.g., the rule illustrated in FIG. 6). In this case, the elements of the data are restored on the screen of the display unit 50 as if the elements spirally welled up from the pointed position.

In addition, the elements of the data may be restored on the screen in a rule which is inversely related to the rule illustrated in FIG. 5. In this case, the elements of the data are restored on the screen as if the elements radially welled up from the pointed position.

Figure 9:
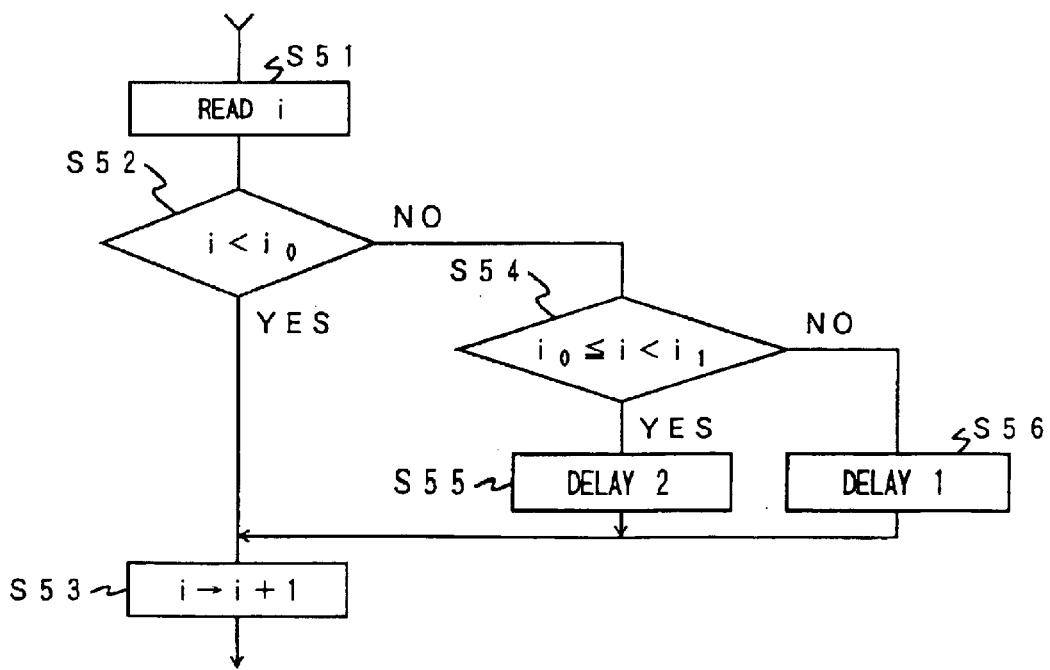
FIG. 9 is a flowchart illustrating a process for controlling a speed at which the data is restored.

In the process shown in FIG. 8, steps shown in FIG. 9 may be added after step S41 or substituted for step S41. In the following embodiment, for example, steps shown in FIG. 9 are substituted for step S41 shown in FIG. 8. Due to a process of steps shown in FIG. 9, the speed at which the elements of the data are restored is decreased in accordance with a degree of restoration of the elements.

After the sparse data is obtained in step S40 shown in FIG. 8, the CPU starts a process of steps shown in FIG. 9. Referring to FIG. 9, the CPU reads a count value i of an internal counter in step S51. The internal counter has been already initialized at "0". The CPU determines, in step S52, whether the count value i is less than a first reference value io (i<io). If the count value i is less than the first reference value io, the count value i is incremented by one (i→i+1) in step S53. After this, step S42 shown in FIG. 8 is executed.

Until the count value i of the internal counter reaches the first reference value io, step S40 shown in FIG. 8 and steps S51, S52 and S53 shown in FIG. 9 are repeatedly executed. As a result, a process for restoring the data in step S40 is repeatedly executed at short intervals.

When the count value i of the internal counter reaches the first reference value io, the CPU further determines, in step S54, whether the count value i of the internal counter is within a range between the first reference value io and a second reference value i1 greater than the first reference value io (io≦i<i1). If the count value i is within the range (io≦i<i1), a delay timer having a second delay time (2) is activated in step S55. After the second delay time (2) elapses, the CPU causes the count value i of the internal counter to increment by one (i→i+1) in step S53. In this case, until the count value i of the internal counter reaches the second reference value i1, step S40 shown in FIG. 8 and steps S51, S52, S54, S55 and S53 are repeatedly executed. As a result, the process for restoring the data in step S40 is repeatedly executed at second intervals each of which corresponds to the second delay time (2). Since the intervals at which the process for restoring the data in step S40 is repeatedly executed lengthen, the speed at which the elements of the data are restored is decreased.

Further, if the count value i exceeds the second reference value i1 (i>i1), a delay timer having a first delay time (1) is activated in step S56. The first delay time (1) is greater than the second delay time (2) described above. After the first delay time (1) elapses, the CPU causes the count value i of the internal counter to increment by one (i→i+1) in step S53. In this case, step S40 shown in FIG. 8 and steps S51, S52, S54, S56 and S53 are repeatedly executed. As a result, the process for restoring the data in step S40 is repeatedly executed at first intervals each of which corresponds to the first delay time (1). Since the first intervals corresponding to the first delay time (1) are greater than the second intervals corresponding to the second delay time (2), the speed at which the elements of the data are restored is further decreased.

According to the above process, the speed at which the elements of the data are restored is gradually decreased in accordance with the increasing of the number of elements restored on the screen. Thus, the elements (e.g., characters) of the data (e.g., a character image) can be restored on the screen as if the elements realistically welled up from the pointed position.

In the first embodiment as described above, the data processing apparatus is formed using the general purpose computer. However, the present invention is not limited to this. The data processing apparatus according to the present invention may be formed using a portable remote computer terminal and other types of computers.

A description will now be given of a second embodiment of the present invention.

Figure 10:
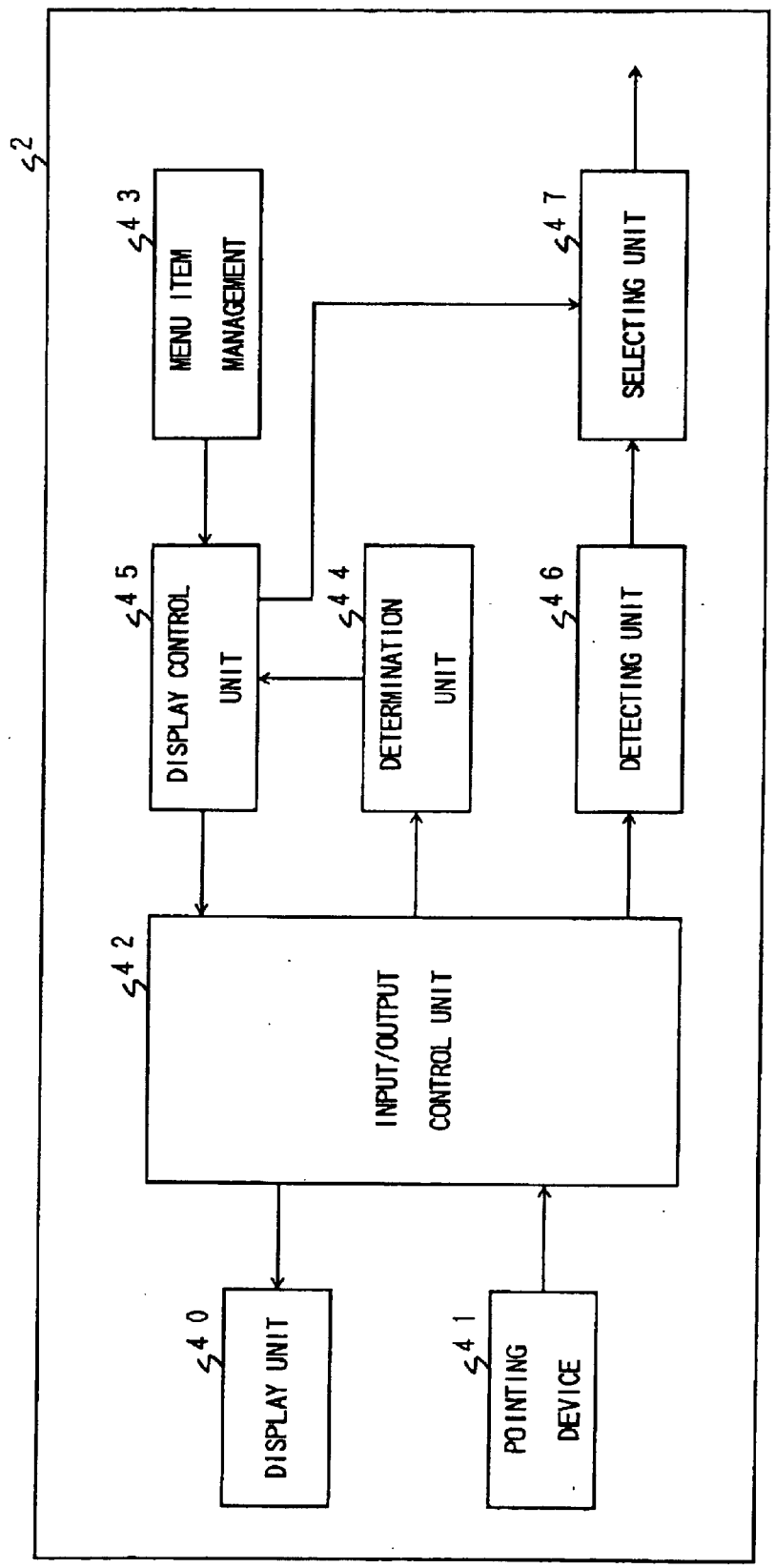
FIG. 10 is a functional block diagram illustrating a data processing apparatus including a display control system according to a second embodiment of the present invention.

A data processing apparatus according to the second embodiment of the present invention is functionally formed as shown in FIG. 10. Referring to FIG. 10, the data processing apparatus 2 has a display unit 40, a pointing device 41 and an input/output control unit 42. The data processing apparatus 2 further has a menu item management unit 43, a determination unit 44, a display control unit 45, a detecting unit 46 and a selecting unit 47.

The display unit 40 is formed, for example, using a LCD (Liquid Crystal Display) panel. The pointing device 41 is used to point to positions on a screen of the display unit 40. The input/output control unit 42 performs interface processes for the display unit 40 and the pointing device 41.

The menu item management unit 43 manages menu items which are to be displayed on the screen of the display unit 40. The determination unit 44 determines whether or not an instruction for displaying menu items has been issued. The display control unit 45 causes menu items managed by the menu item management unit 43 to be displayed on the screen of the display unit 40 one by one in turns. The detecting unit 46 detects that a pointing operation using the pointing device 41 is interrupted. The selecting unit 47 selects a menu item to be activated.

In the data processing apparatus which is functionally configured as described above, the following processes are formed.

When the determination unit 44 determines that an instruction for displaying menu items has been issued, the display control unit 45 causes the menu items managed by the menu item management unit 43 to be displayed in an area including a position pointed to by the pointing device 41 on the screen of the display unit 40 one by one in turns. In this state, when the detecting unit 46 detects that the pointing operation using the pointing device 41 has been interrupted, the selecting unit 47 selects a menu item which is displayed at this time as an item to be activated.

According to the data processing apparatus of the second embodiment of the present invention as described above, in response to the pointing operation using the pointing device 41, the menu items are displayed on the screen of the display unit 40 one by one in turns. In response to interruption of the pointing operation, a single menu item to be activated is selected. Since all the menu items which can be selected are not simultaneously displayed on the screen, an area in which the menu items are displayed on the screen can be narrowed. In addition, an operation for selecting a menu item from among a plurality of menu items can be simplified. Thus, a plurality of menu items can be displayed on a limited area of the display screen so as to be easily selected by a user.

Figure 11:
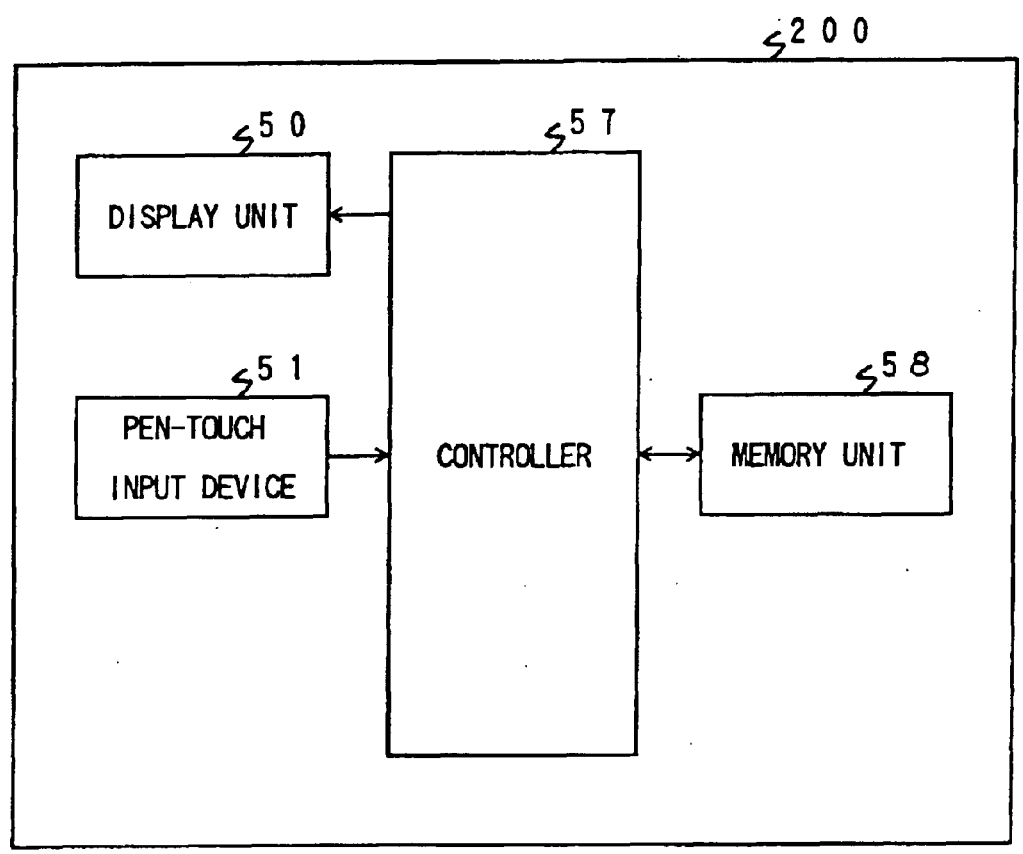
FIG. 11 is a block diagram illustrating an example of a hardware constitution of the data processing apparatus according to the second embodiment of the present invention.

The data processing apparatus according to the second embodiment of the present invention as described above may be formed, for example, using a portable remote computer terminal. In this case, the computer system has hardware as shown in FIG. 11. Referring to FIG. 11, the computer system 200 has a display unit 50 such as an LCD (Liquid Crystal Display) panel and a pointing device 51 such as a pen-touch input device. The computer system 200 further has a controller 57 and a memory unit 58.

The controller 57 includes a CPU (Central Processing Unit) which performs various processes corresponding to the functions of the data processing apparatus as described above. The memory unit 58 includes various types of memories, such as a RAM, a ROM and a memory card (a ROM card and/or a RAM card), for storing various types of data and programs. A menu file used to manage menu items to be displayed on the screen of the display unit 50 is stored in a memory included in the memory unit 58.

A program corresponding to the functions of the data processing apparatus described above has been previously installed in the ROM of the memory unit 56. The program may be supplied as a part of an application program, such as a word-processing application program, to the portable remote computer terminal (the computer system 200) using a ROM card. The CPU in the controller 57 executes processes in accordance with the program, stored in the memory unit 58, corresponding to a procedure shown in FIG. 12.

Figure 12:
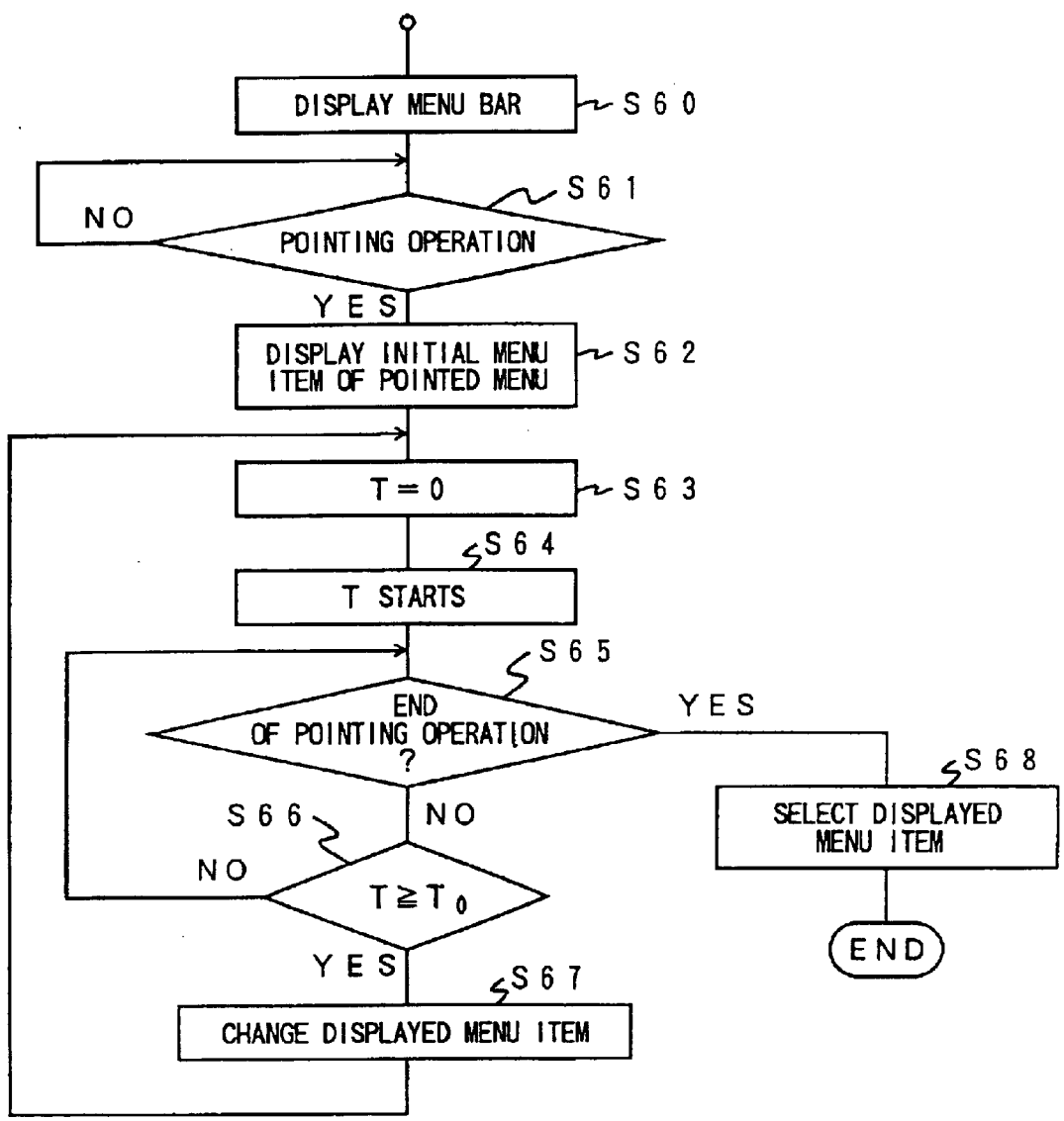
FIG. 12 is a flowchart illustrating a process for displaying menu items.
Figure 13:
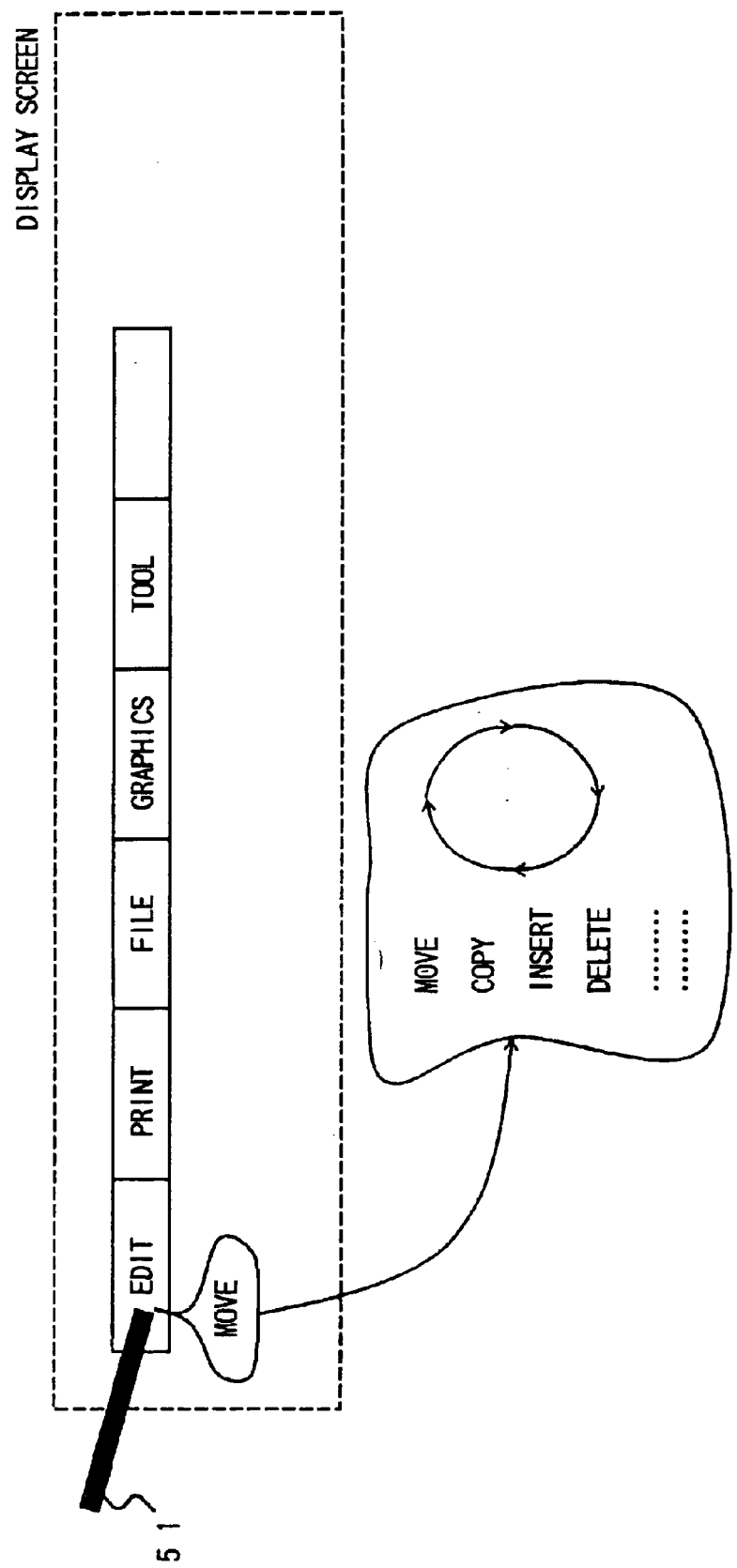
FIG. 13 is a diagram illustrating a menu bar and menu items which are displayed on a display screen.

Referring to FIG. 12, the CPU causes a menu bar to be displayed on the screen of the display unit 50 in step S60. The menu bar is formed, as shown in FIG. 13, of menus (EDIT, PRINT, FILE, GRAPHICS and TOOL). Menu items included in the respective menus (EDIT, PRINT, FILE, GRAPHICS and TOOL) in the menu bar are managed in the menu file stored in the memory unit 58. For example, the menu "EDIT" includes menu items "MOVE", "COPY", "INSERT", "DELETE", etc. In a state where the menu bar is displayed on the screen of the display unit 50, the CPU is waiting for a pointing operation for pointing to one of menus in the menu bar in step S61. This pointing operation means an instruction for displaying menu items. A user performs the pointing operation which points to, for example, a menu "EDIT" in the menu bar using the pointing device 51. In response to the pointing operation, the CPU reads out a first menu item "MOVE" of the menu pointed to (pointed menu) "EDIT" from the menu file in the memory unit 58. Only the first menu item "MOVE" is then displayed at the position pointed to by the pointing device on the screen of the display unit 50 in step S62.

After this, the CPU causes an internal timer to be reset to "0" (T=0) and to start in steps S63 and S64. The CPU then determines, in step S65, whether or not the pointing operation is interrupted, that is, whether or not the pointing device 51 (a touch-pen) is separated from the screen of the display unit 50. After this, the CPU further determines, in step S66, whether or not a timer value T of the internal timer reaches a reference value To. Until the timer value T reaches the reference value To, the CPU is repeatedly determining, in step S65, whether or not the pointing operation is interrupted. If the timer value T reaches the first reference value To (T≧To) before the pointing operation is interrupted, the CPU causes the menu item displayed on the screen to be changed from the first menu item "MOVE" to the second menu item "COPY" in, step S67.

After the displayed menu item is changed, the internal timer is reset to "0" and starts in the same manner as described above (steps S63 and S64). The CPU then determines, in step S65, whether or not the pointing operation is interrupted. After this, the same process (in steps S66, S67, S63, S64 and S66) is repeated until the CPU determines that the pointing operation is interrupted. During this process, the displayed menu item is changed one by one in turns ("MOVE"→"COPY"→"INSERT"→"DELETE"→ . . . "MOVE"→ . . .) at intervals each of which corresponds to the reference value To.

For example, when the pointing operation is interrupted, that is, when the pointing device 51 is separated from the screen of the display unit, the CPU causes a menu item which is displayed at this time to be selected in step S68. As a result, the CPU recognizes that an instruction corresponding to the selected menu item has been received.

The data processing apparatus according to the second embodiment of the present invention is formed in the portable remote computer terminal. However, the present invention is not limited to this. The processing apparatus having the functions described in the second embodiment may be formed in a general purpose computer (e.g., a personal computer).

The present invention is not limited to the aforementioned embodiments, and other variations and modifications may be made without departing from the scope of the claimed invention.

What is claimed is:

1. A display control system for data control during screen display operations, said system comprising:
a pointing device that indicates a position on a screen of a display unit; and
a deleting unit that, at intervals, successively deletes first elements of a graphic from a specified area of the screen at the indicated position and rearranges second elements of the graphic remaining in the specified area to provide an appearance that the second elements of data are gradually withdrawn from the specified area at the indicated position,
said deleting unit including a first speed control unit that automatically controls the speed of the intervals to be automatically performed followingly faster in accordance with successive deletions of the first elements, such that following intervals are made faster by decreasing a delay time thereof.

2. The display control system as claimed in claim 1, further comprising:
a completion indicating unit that displays a predetermined image at a specified position on the screen when all the second elements of the graphic have been deleted as first elements of the graphic.

3. A computer-readable medium encoded with a program for controlling data display operations in a computer, said program comprising the functions of:

detecting a position on a screen of a display unit, the position being indicated by a pointing operation;
at intervals, successively deleting first elements of a graphic from a specified area of the screen at the indicated position, and rearranging second elements of the graphic remaining in the specified area, to provide an appearance that the second elements of the graphic are gradually withdrawn from the specified area at the indicated position; and
automatically controlling, by a speed control mechanism, a speed of the intervals to be automatically followingly faster during which the first elements of the graphic are successively deleted, such that following intervals are made faster by decreasing a delay time thereof.

4. The computer-readable medium as claimed in claim 3, wherein said program further comprises the function of displaying a predetermined image at a specified position on the screen when all the second elements of the graphic have been deleted as first elements of the graphic.

5. A data processing apparatus using a computer specifically configured by execution of a program encoded on a computer-readable medium, the program controlling data display operations in a computer and including the functions of:

detecting a position on a screen of a display unit, the position being indicated by a pointing operation;
at intervals, successively deleting first elements of a graphic from a specified area of the screen at the indicated position, and rearranging second elements of the graphic remaining in the specified area, to provide an appearance that the second elements of the graphic are gradually withdrawn from the specified area at the indicated position; and
automatically controlling by a speed control mechanism, a speed of successive intervals to be automatically followingly faster during which the first elements of the graphic are successively deleted, such that following intervals are made faster by decreasing a delay time thereof.

6. The data processing apparatus as claimed in claim 5, wherein the program further comprises the function of displaying a predetermined image at a specified position on the screen when all the second elements of the graphic have been deleted as first elements of the graphic.

7. A display controller for data control during screen display operations, the controller comprising:
a deleting unit that, at intervals, automatically successively deletes first elements of a graphic from a specified area of a display screen at a position indicated by a pointing device and rearranges second elements of the graphic remaining in the specified area to provide an appearance that the second elements of the graphic are gradually withdrawn from the specified area,
said deleting unit including a first speed control unit that automatically controls a speed of the intervals to be automatically followingly faster during which the first elements are successively deleted, such that following intervals are made faster by decreasing a delay time thereof.

8. The display controller as claimed in claim 7, further comprising:
a completion indicating unit that displays a predetermined image at a specified position on the screen when all the second elements of the graphic have been deleted as first elements of the graphic.

9. A display controller for data control during screen display operations, said controller comprising:

a deleting unit that, at intervals, automatically successively deletes and rearranges elements of a graphic from a screen of a display unit at a position indicated by a pointing device to give an appearance of the elements being gradually withdrawn into the position; and a speed control unit that automatically controls the speed of the intervals to be automatically followingly faster during which the elements of the graphic are successively deleted, such that following intervals are made laster by decreasing a delay time thereof.

10. A display controller for data control during screen display operations, said controller comprising:

a restoring unit that, at intervals, automatically successively restores and rearranges elements of a graphic to a screen of a display unit at a position indicated by a pointing device to give an appearance of the graphic being expelled outward from the position; and a speed control unit that automatically controls the speed of the intervals to be automatically followingly slower during which the elements of the graphic are successively restored to the screen, such that following intervals are made slower by increasing a delay time thereof.

11. A computer-readable medium encoded with a program for controlling data display operations in a computer, said program comprising the functions of:

at intervals, automatically successively deleting elements of a graphic from a screen of a display unit at a position indicated by a pointing device to give an appearance of the graphic being withdrawn into the position; and automatically controlling, by a speed control mechanism, the intervals to be automatically followingly faster during which the elements of the graphic are successively deleted, such that following intervals are made faster by decreasing a delay time thereof.

12. A computer-readable medium encoded with a program for controlling data display operations in a computer, said program comprising the functions of:

at intervals, automatically successively restoring elements of a graphic to a screen of a display unit at a position indicated by a pointing device to give an appearance of the image being expelled outward from the position; and automatically controlling, by a speed control mechanism the speed of the intervals to be automatically followingly slower during which the elements of the graphic are successively restored to the screen, such that following intervals are made slower by increasing a delay time thereof.

13. A display controller for data control during screen display operations, said controller comprising:

a deleting unit that, at intervals, successively deletes elements of a graphic from a screen of a display unit at a position indicated by a pointing device to give an appearance of the graphic being withdrawn into the position; and a speed control unit that automatically controls the speed of the intervals to be automatically followingly varied in speed during which the elements of the graphic are successively deleted, such that following intervals vary in speed by varying a delay time thereof.

14. A display controller for data control during screen display operations, said controller comprising:

a restoring unit that, at intervals, successively restores elements of a graphic to a screen of a display unit at a position indicated by a pointing device to give an appearance of the graphic being expelled outward from the position; and a speed control unit that automatically controls the speed of the intervals to be automatically followingly varied in speed during which the elements of the graphic are successively restored to the screen, such that following intervals vary in spend by varying a delay time thereof.

15. A computer-readable medium encoded with a program for controlling data display operations in a computer, said program comprising the functions of:

at intervals, automatically successively deleting elements of a graphic from a screen of a display unit at a position indicated by a pointing device to give an appearance of the image being withdrawn into the position; and automatically controlling, by a speed control mechanism, the speed of the intervals to be automatically followingly varied during which the elements of the graphic are successively deleted, such that following intervals vary in speed by varying a delay time thereof.

16. A computer-readable medium encoded with a program for controlling data display operations in a computer, said program comprising the functions of:

at intervals, automatically successively restoring elements of a graphic to a screen of a display unit at a position indicated by a pointing device to give an appearance of the graphic being expelled outward from the position; and automatically controlling, by a speed control mechanism, the speed of the intervals to be automatically successively varied in speed during which the elements of the graphic are successively restored to the screen, such that following intervals vary in speed by varying a delay time thereof.

17. A method for controlling data display operations, the method comprising:

detecting a position on a screen of a display unit, the position being indicated by a pointing operation;

at intervals, automatically successively deleting first elements of a graphic from a specified area of the screen at the indicated position, and rearranging second elements of the graphic remaining in the specified area, to provide an appearance that the second elements of the graphic are gradually withdrawn from the specified area at the indicated position; and automatically controlling, by a speed control mechanism, the speed of the intervals to be automatically followingly faster during which the first elements of the graphic are successively deleted, such that following intervals are made faster by decreasing a delay time thereof.

18. The method as claimed in claim 17, further comprising displaying a predetermined image at a specified position on the screen when all the second elements of the graphic have been deleted as first elements of the graphic.

19. A method for controlling data display operations, the method comprising:

at intervals, automatically successively deleting elements of a graphic from a screen of a display unit at a position indicated by a pointing device to give an appearance of the graphic being withdrawn into the position; and automatically controlling, by a speed control mechanism, the speed of the intervals to be automatically followingly faster during which the elements of the graphic are successively deleted, such that following intervals are made faster by decreasing a delay time thereof.

20. A method for controlling data display operations, the method comprising:

at intervals, automatically successively restoring elements of a graphic to a screen of a display unit at a position indicated by a pointing device to give an appearance of the graphic being expelled outward from the position; and automatically controlling, by a speed control mechanism, the speed of the intervals to be automatically followingly slower during which the elements of the graphic are successively restored to the screen, such that following intervals are made slower by increasing a delay time thereof.

21. A method for controlling data display operations, the method comprising:

by intervals, automatically successively deleting elements of data of a graphic item from a screen of a display unit and shifting non-deleted data elements thereof toward a position indicated by a pointing device to give an appearance of the graphic item being withdrawn into the position; and automatically controlling, by a speed control mechanism, the time of the successive intervals to be followingly automatically decreased, as the elements of data are successively deleted, by decreasing a delay time thereof.

22. A method for controlling data display operations, the method comprising:

by intervals, automatically successively restoring elements of data of a graphic item to a screen of a display unit and shifting restored data elements thereof away from a position indicated by a pointing device to give an appearance of the graphic item being expelled outward from the position; and automatically controlling, by a speed control mechanism, the times of the successive intervals to be followingly automatically increased, as the elements of data are successively restored to the screen, by increasing a delay time thereof.

23. A method for erasing/restoring a graphic from/to a display, the method comprising:

responsive to a user command automatically controlling application of a graphic thinning/expanding process such that the thinning/expanding process is applied to the graphic with an automatically gradually increasing or decreasing rate of thinning, where an application of the thinning/expanding process thins or adds a ratio of current pixels in or to be added to the graphic, where the image has an appearance of being withdrawn toward or expanded away from a point of convergence/restoration, and where the rate of the thinning/expanding process is increased or decreased by using a rate control mechanism that automatically varies a factor that controls the rate.

\* \* \* \* \*

UNITED STATES PATENT AND TRADEMARK OFFICE
CERTIFICATE OF CORRECTION

PATENT NO. : 7,024,634 B2  Page 1 of 1
APPLICATION NO. : 09/734701
DATED : April 4, 2006
INVENTOR(S) : Toru Okawa It is certified that error appears in the above-identified patent and that said Letters Patent is hereby corrected as shown below:

On the Title page, Abstract (57), column 2, line 19, change "item," to --item--

Column 14, line 34, after "controlling" insert --,--

Column 15, line 11, change "laster" to --faster--

Column 15, line 32, after "by a" delete "the"

Column 15, line 33, after "the" insert --speed of the--

Column 15, line 45, "mechanism" insert --,--

Column 16, line 8, change "spend" to --speed--

Signed and Sealed this

Twenty-first Day of November, 2006

JON W. DUDAS
*Director of the United States Patent and Trademark Office*